United States Patent Office.

RUDOLPH C. KLEIN, OF ST. LOUIS, MISSOURI.

Letters Patent No. 113,176, dated March 28, 1871.

IMPROVEMENT IN COMPOSITIONS FOR LUBRICATING JOURNALS.

The Schedule referred to in these Letters Patent and making part of the same.

*To all whom it may concern:*

Be it known that I, RUDOLPH C. KLEIN, of St. Louis, in the county of St. Louis and in the State of Missouri, have invented a certain new and useful Lubricant for Wagon-Axles; and do hereby declare that the following is a full, clear, and exact description thereof.

My invention belongs to a class of lubricants used upon the bearings of wagon-axles; and It consists in the hereinafter-described compound, substantially as shown and described.

In the preparation of my lubricant I take two-thirds of a pound of hog's lard, one-third of a pound of black lead, one-fourth of a pound of resin, and one-eighth of a pound of mercury, and mix them thoroughly together.

The action of the lard and black lead is to decrease the friction between the bearing surface. The resin increases the adhesiveness of the mixture, so as to prevent it from melting and wasting away in summer, while the mercury, operating with the lard, causes a continuous discharge of electricity from said bearing-surfaces, and thereby prevents the heating and cutting of the same.

Having thus fully set forth the nature and merits of my invention,

What I claim as new is—

The hereinbefore-described lubricating-compound, substantially as and for the purpose specified.

In testimony that I claim the foregoing I have hereunto set my hand this 4th day of February, 1871.

Witnesses: RUDOLPH C. KLEIN.
ALEXANDER LOWRY,
HENRY TETERS.